United States Patent
Nomura et al.

[11] Patent Number: 5,846,279
[45] Date of Patent: Dec. 8, 1998

[54] PROCESS FOR PRODUCTING A CONTAMINATION-RESISTANT FLOAT GLASS

[75] Inventors: Takaiki Nomura, Osaka; Kazufumi Ogawa, Nara; Jun Oe, Hyogo; Tadashi Ohtake, Osaka; Tohru Nakagawa, Shiga; Toshimitsu Kurumizawa, Osaka; Shuzou Tokumitsu; Tsuneo Shibata, both of Hyogo; Hidekata Kawanishi; Satoshi Shimizu, both of Osaka; Mamoru Isogai, Nara, all of Japan

[73] Assignee: Matsushita Electric Industrial Co., Ltd., Osaka, Japan

[21] Appl. No.: 832,271

[22] Filed: Apr. 3, 1997

[30] Foreign Application Priority Data

| Apr. 4, 1996 | [JP] | Japan | 8-082293 |
| Nov. 8, 1996 | [JP] | Japan | 8-296112 |
| Nov. 8, 1996 | [JP] | Japan | 8-296113 |
| Nov. 8, 1996 | [JP] | Japan | 8-296114 |

[51] Int. Cl.$^6$ .......................... C03B 37/00; C03C 17/00; C03C 25/02
[52] U.S. Cl. .............. 65/30.1; 65/32.2; 65/60.1; 65/60.3; 65/60.52; 65/60.8; 427/384; 427/387; 427/389.7
[58] Field of Search ................. 65/25.3, 29.18, 65/30.1, 32.2, 60.1, 60.3, 60.52, 60.8, 992, 157; 427/384, 387, 398.7, 428; 118/56, DIG. 15

[56] References Cited

U.S. PATENT DOCUMENTS

| 4,539,061 | 9/1985 | Sagiv ............ 156/278 |
| 5,250,322 | 10/1993 | Takahashi et al. ............ 427/226 |
| 5,368,892 | 11/1994 | Berquier . | |
| 5,413,865 | 5/1995 | Nakamura et al. ............ 428/432 |
| 5,424,130 | 6/1995 | Nakanishi et al. ............ 428/410 |
| 5,510,141 | 4/1996 | Makita et al. ............ 427/165 |
| 5,523,161 | 6/1996 | Goodwin ............ 428/421 |

FOREIGN PATENT DOCUMENTS

| 0 352 180 | 1/1990 | European Pat. Off. . |
| 0 492 545 | 7/1992 | European Pat. Off. . |
| 0 719 743 | 7/1996 | European Pat. Off. . |
| 0 745 567 | 12/1996 | European Pat. Off. . |
| 0 745 568 | 12/1996 | European Pat. Off. . |
| 64-70917 | 3/1989 | Japan . |

OTHER PUBLICATIONS

Hayashi, et al., "Mechancial Durability of Water–Repellent Film on Glass", *Journal of the Ceramic Society of Japan*, 102 (2), 1994, pp. 206–209; and English Abstract thereof.

*Primary Examiner*—Peter Chin
*Assistant Examiner*—Jacqueline A. Ruller
*Attorney, Agent, or Firm*—Merchant, Gould, Smith, Edell, Welter & Schmidt, P.A.

[57] ABSTRACT

This invention provides a contamination-resistant float glass showing even quality in durability and its good quality sufficienty. The film for contamination-resistance is formed only on the top-side surface of a float glass. The surface, free from tin diffused from a float bath, can be identified by ultraviolet irradation. A solution including a chemical adsorbent like fluoroalkyltrichlorosilane is applied to the top-side surface by a roller coater. The adsorbent can be prevented from hydrolyzing with dry air around the coating portion of the coater. Surplus solution can be removed with dry air blown on the surface to make the contamination-resistant property and the appearance better. The chemical adsorbent is bonded to the surface via a siloxane bond to form a thin film. The contamination-resistant float glass is installed in the front door of an apparatus like a toaster oven with the film facing the inside of the oven. The film on the top-side surface shows higher contact angles than that on the bottom-side surface in durability tests.

16 Claims, 11 Drawing Sheets

PROCESS FOR PRODUCING A CONTAMINATION-RESISTANT FLOAT GLASS

FIELD OF THE INVENTION

This invention relates to a contamination-resistant float glass and a process of producing it, which has a film sticking to a glass surface with siloxane bonds. More particularly, this invention relates to a contamination-resistant float glass, which is suitable for a cooking apparatus like a toaster oven, a microwave oven, an electric oven and a gas oven having a window for seeing into the inside, and a process of producing it. This invention further relates to a cooking apparatus having such a contamination-resistant float glass.

BACKGROUND OF THE INVENTION

A float glass is formed in a float bath including molten tin. It has flat and smooth surfaces that are formed without grinding and polishing, because the plate shape of a float glass is not given by a process in which molten glass is forced to be flattened by rolls, but by a process in which molten glass freely spreads over molten tin due to the difference of their specific gravities. Not a few kinds of float glasses with functional films on their surfaces have come to be generally used. For example, a contamination-resistant float glass is used for buildings, automobiles, cooking apparatus and the like. Such a contamination-resistant float glass can be produced by making a solution including a silane-based compound contact with a surface of a float glass. During the process, the silane-based compound is adsorbed by reacting with a hydroxyl group on the surface. Japanese Unexamined Patent Publication No. 70917/1989 discloses such a process. In this process, a glass plate dipped into a solution including a silane-based compound is removed from the solution and dried. The both sides of the glass are covered with films.

Known contamination-resistant glasses produced by a process as described above, however, are uneven in durability, especially in heat-resistance and abrasion-resistance. These characteristics are very important for a contamination-resistant glass used in a cooking apparatus and the like.

SUMMARY OF THE INVENTION

The present invention has been developed in light of the above drawbacks in the prior art.

An objective of the invention is to control uneven characteristics of contamination-resistant glasses and provide the desired properties.

As described above, a float glass is formed on molten tin in a float bath so that it has two different surfaces indistinguishable to the naked eye; one is a surface that was formed in contact with molten tin (a bottom-side surface), and the other is a surface that was formed out of contact with molten tin (a top-side surface). There is a small amount of tin spread into a bottom-side surface, because the surface is kept contact with molten tin, which is heated and maintained at a high temperature suitable for forming glass (about 840°–920° C.) in a float bath. The thin layer into which tin is diffused, generally called a tin layer, may be deemed to influence a property of the film on the layer where the film is adsorbed to the surface chemically, not physically.

The present invention has been completed by considering the influence of the tin layer and investigating preferred conditions of producing the film on the layer.

In accordance with one aspect of the present invention, there is provided a contamination-resistant float glass, which comprises:

a float glass having a top-side surface not comprising a tin layer and a bottom-side surface comprising a tin layer; and a film for contamination-resistance, formed only on the top side surface, comprising a molecule including a straight-chain of carbons, wherein the molecule is covalently bonded to the top-side surface via a siloxane bond.

There is an unadulterated silicate surface on the top-side of a float glass so that the top-side surface is rich in hydrophilic groups like hydroxyl groups which can act as adsorption points. On the other hand, there is a tin surface on the bottom-side so that the bottom-side surface is poor in adsorption points. It has been found to make unevenness in durability smaller and durability higher as a whole when the contamination-resistant film is formed only on the top-side surface selected from the two kinds of surfaces.

It is preferable in the contamination-resistant float glass that the molecule includes a group selected from the group consisting of an alkyl group and a fluoroalkyl group. A fluoroalkyl group is more preferred in view of the contamination-resistant property.

It is preferable in the contamination-resistant float glass that the molecule is represented by the following formula:

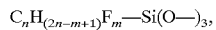
$$C_nH_{(2n-m+1)}F_m—Si(O—)_3,$$

wherein n represents a natural number, preferably an integer between 1 and 22; and m represents an integer between zero and 2n+1.

It is preferable in the contamination-resistant float glass that the molecule is represented by the following formula:

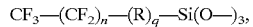
$$CF_3—(CF_2)_n—(R)_q—Si(O—)_3,$$

wherein n represents a natural number, preferably an integer between 1 and 22; q represents zero or one; and R represents an alkyl group, a vinyl group, an ethynyl group, an aryl group, or a group including a silicon atom or an oxygen atom, preferably an alkyl group.

It is preferable in the contamination-resistant float glass that the molecules including the straight-chain of carbons form a film selected from the group consisting of a monomolecular film and a polymer film.

It is preferable in the contamination-resistant float glass that the top-side surface, to which the molecules including the straight-chain of carbons bond, is used as the surface expected to be contaminated, because the contamination-resistant property of the glass is effectively shown. The surface expected to be contaminated is, for example, the inner surface of the window of a cooking apparatus like an electric oven, a gas oven, a microwave oven and a toaster oven; the outer surface of the window of a vehicle like an automobile; and the outer surface of the window of a building and a house.

In accordance with another aspect of the present invention, there is provided a process for producing a contamination-resistant float glass, comprising:

selecting a top-side surface from the surfaces of a float glass;

contacting a solution including a silane-based compound having a straight-chain of carbons, selected from the group consisting of silicon halogenide, silicon alkoxide and silicon isocyanide, only with the top-side surface; and reacting the silane-based compound with a hydrophilic group on the top-side surface to remove a molecule and bond a molecule having the straight-chain of carbons to the top-side surface covalently via a siloxane bond, It is preferable that the process further comprises a drying step in which the top-side surface is dried after contacting the solution.

It is preferable in the process that contacting the solution with the top-side surface is done with a roller coater in view of the uniformity of coating, although other means like a brush, a cast coater with a film, a docter blade, a spray coater and a spin coater may be selected. The roll coater preferably includes a doctor roll for widening the solution to the width for coating and a coating roll for applying the solution to the top-side surface. The doctor roll can be used for controlling a thickness of applied solution.

It is preferable in the process that the humidity around the coating roll and the doctor roll is maintained at not more than 35%, because such a low humidity may prevent the compound in the solution from hydrolizing, even if the solution includes a compound which is easy to hydrolize like a trichlorosilane-based compound. The low humidity is preferably maintained with low humidity gas. It is more preferable that the humidity around the rolls is maintained at not more than 10%. The coating portion in a coating apparatus may be divided from the atmosphere by air curtains to prevent hydrolization effectively.

It is preferable in the process that low humidity gas is supplied into a space covered with a covering that covers the coating roll and the doctor roll so that the humidity around the rolls is maintained at not more than 35%, because low humidity gas may prevent the compound in the solution from hydrolizing, as descrived above.

It is preferable in the process that surplus solution is removed in the drying step with low humidity gas blown on the top-side surface. The gas may be supplied at room temperature. For example, dry air may be used as the low humidity gas.

It is preferable in the process that the molecule includes a group selected from the group consisting of an alkyl group and a fluoroalkyl group.

It is preferable in the process that the silane-based compound is represented by the following formula:

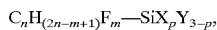

$C_nH_{(2n-m+1)}F_m—SiX_pY_{3-p}$, wherein n represents a natural number, preferably an integer between 1 and 22; m represents an integer between zero and 2n+1; p represents zero, one or two; X represents hydrogen, an alkyl group, an alkoxyl group, an alkyl group with fluorine or an alkoxyl group with fluorine; and Y represents a halogen group, an alkoxyl group or an isocyanate group.

It is preferable in the process that the silane-based compound is represented by the following formula:

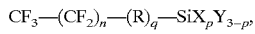

$CF_3—(CF_2)_n—(R)_q—SiX_pY_{3-p}$, wherein n represents a natural number, preferably an integer between 1 and 22; p represents zero, one or two; q represents zero or one; R represents an alkyl group, a vinyl group, an ethynyl group, an aryl group or a group including a silicon atom or an oxygen atom, preferably an alkyl group; X represents hydrogen, an alkyl group, an alkoxyl group, an alkyl group with fluorine or an alkoxyl group with fluorine; and Y represents a halogen group, an alkoxyl group or an isocyanate group.

It is preferable in the process that the reacting the silane-based compound with the hydrophilic group on the top-side surface is accompanied by the elimination of a group selected from the group consisting of halogen, an alkoxyl group and an isocyanate group. When removing a chlorine atom in the compound during reaction with a hydroxyl group on the surface, dehydrochlorination occurs to give a siloxane bond between the compound and the surface.

It is preferable in the process that the molecules including the straight-chain of carbons form a film selected from the group consisting of a monomolecular film and a polymer film.

It is preferable in the process that the top-side surface, to which the molecules including the straight-chain of carbons bond, is used as the surface expected to be contaminated.

It is preferable in the process that the solution includes a non-aqueous solvent whose boiling point is not more than 200° C., because it makes it easy to dry the surface.

It is preferable in the process that the solution includes a solvent whose chief ingredient is silicone, because such a solvent is easy to treat and keep safely. Silicone also has an effect of preventing the silane-based compound from reacting with water in the environment.

It is preferable in the process that the concentration of the silane-based compound in the solutiuon is 10 volume % or less.

In accordance with another aspect of the invention, there is provided a cooking apparatus, which comprises:

a contamination-resistant float glass comprising a float glass having a top-side surface not comprising a tin layer and a bottom-side surface comprising a tin layer, and a film for contamination-resistance, formed only on the top-side surface, comprising a molecule including a straight-chain of carbons, wherein the molecule is covalently bonded to the top-side surface via a siloxane bond;

a window comprising the contamination-resistant float glass, wherein the top-side surface of the float glass is set toward the inside of the cooking apparatus.

As the inner side of the window is exposed to some contamination like spots made of oil and fats, it is useful to make the inner surface resistant contamination and make it easy to keep the inner side clean and remove the spots.

As the cooking apparatus, there can be mentioned an electromagnetic-heated cooking apparatus, an electric-heated cooking apparatus and a gas-heated cooking apparatus, more specificaly, for example, a toaster oven, a microwave oven, an electric oven and a gas oven.

DESCRIPTION OF THE PREFERRED EMBODIMENTS

Figure 1:
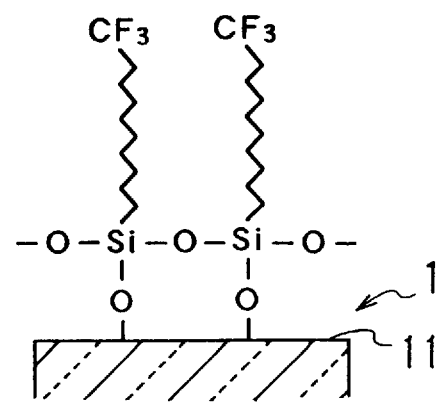
FIG. 1 shows a molecular scale schematic sectional view of a contamination-resistant float glass of the invention.

As shown in FIG. 1, a contamination-resistant float glass 1 of the invention is produced by bonding molecules including a specific group like a fluoroalkyl group to the top-side surface 11 via a siloxane bond to form a film. Such a contamination-resistant glass is more durable than the one having the film on the bottom-side of a float glass. So the films formed only on the top-side surfaces show better evenness in durability than the films formed on either of the surfaces of a float glass. Better evenness is very important in view of a guarantee of quality.

A preferred process of producing such a contamination-resistant glass comprises a selecting step, an ado-sorbing step and a drying step. In the adsorbing step, the top-side surface of a float glass picked out in the selecting step is contacted with a solution including a silane-based compound. In the drying step, the float glass is dried off and has a film showing even quality.

In the selecting step, a top-side surface may be selected by elementary analysis, but it can be more easily selected by ultraviolet irradiation. The surface that emits light when ultraviolet rays are applied, which is due to tin, is a bottom-side surface.

In the adsorbing step, it is preferable that the solution including a silane-based compound is applied to the surface by a roller coater, by which the thickness of the applied solution can be controlled easily. It is preferable that the solution is applied in low humidity to prevent the silane-based compound from hydrolyzing. It is convenient and reliable to control the humidity by dry air. In this adsorbing step, the solution may be applied only to a part of the surface.

In the drying step, dry air with high pressure may be blown on the surface to remove a surplus solution therefrom, because surplus silane-based compound may cause a defect in appearance. Such a blowing step can eliminate a heating step for drying or a washing step.

The process comprising the above steps is an easy and convenient way to produce a film which is covalently bonded to the surface via a siloxane bond.

As the silane-based compound which works as a chemical adsorbent in the invention, there can be mentioned, for example, the compounds represented by the following formulas:

 [1]

 [2]

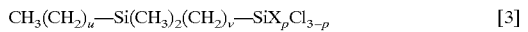 [3]

 [4]

wherein p represents an integer between zero and two; r represents an integer between one and 25; s represents an integer between zero and 12; t represents an integer between one and 20; u represents an integer between zero and 12; v represents an integer between one and 20; w represents an integer between one and 25; and X represents hydrogen, an alkyl group, an alkoxyl group, an alkyl group with fluorine or an alkoxyl group with fluorine.

As the chemical adsorbent, there also can be mentioned, for example, the compounds represented by the following formulas:

 [5]

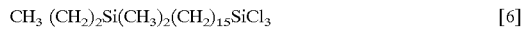 [6]

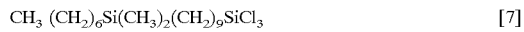 [7]

 [8]

 [9]

 [10]

 [11]

As the chemical adsorbent, there also can be mentioned, for example, the compounds represented by the following formulas:

 [12]

 [13]

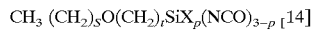 [14]

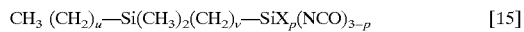 [15]

 [16]

wherein p, r, s, t, u, v, w and X are as defined above.

As the chemical adsorbent including an isocyanatosilane group (—SiOCN), there also can be mentioned, for example, the compounds represented by the following formulas:

 [17]

 [18]

 [19]

 [20]

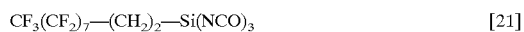 [21]

 [22]

 [23]

The above compounds have an isocyanatosilane group (—SiOCN) in place of chlorosilane group (—SiCl$_3$) in the compounds represented by the formulas [5]–[11].

As the chemical adsorbent, there can be mentioned, for example, the compound represented by the formula: $SiX_k(OA)_{4-k}$, wherein k represents an integer between zero and three; A represents an alkyl group; and X is defined above.

As the chemical adsorbent, there also can be mentioned, the compound represented by the following formulas: $CF_3(CF_2)_n$—$(R)_q$—$SiX_p(OA)_{3-p}$; $CH_3(CH_2)_r$—$SiX_p(OA)_{3-p}$; $CH_3$—$(CH_2)_s$—O—$(CH_2)_t$—$SiX_p(OA)_{3-p}$; $CH_3$—$(CH_2)_u$—$Si(CH_3)_2$—$(CH_2)_v$—$SiX_p(OA)_{3-p}$; and $CF_3COO$—$(CH_2)_w$—$SiX_p(OA)_{3-p}$, wherein n represents an integer of one or more, preferably between one and 22; R represents an alkyl group, a vinyl group, an ethynyl group, an aryl group, or a group including a silicon atom or an oxygen atom, preferably an alkyl group; q represents zero or one; and X, A, p, r, s, t, u, v and w are defined above. The compound represented by the formula: $CF_3-(CF_2)_n-(R)_q-SiX_p(OA)_{3-p}$ is better in view of the contamination-resistant property.

More specifically, there can be mentioned as the chemical adsorbent, for example, the compounds represented by the following formulas:

$CH_3CH_2O(CH_2)_{15}Si(OCH_3)_3$ [24]

$CF_3CH_2O(CH_2)_{15}Si(OCH_3)_3$ [25]

$CH_3(CH_2)_2Si(CH_3)_2(CH_2)_{15}Si(OCH_3)_3$ [26]

$CH_3(CH_2)_6Si(CH_3)_2(CH_2)_9Si(OCH_3)_3$ [27]

$CH_3COO(CH_2)_{15}Si(OCH_3)_3$ [28]

$CF_3(CF_2)_5(CH_2)_2Si(OCH_3)_3$ [29]

$CF_3(CF_2)_7-C_6H_4-Si(OC_2H_5)_3$ [30]

$CH_3(CH_2)O(CH_2)_{15}Si(OCH_3)_3$ [31]

$CH_3(CH_2)_2Si(CH_3)_2(CH_2)_5Si(OC_2H_5)_3$ [32]

$CH_3(CH_2)_2Si(CH_3)_2(CH_2)_9Si(OC_2H_5)_3$ [33]

$CF_3(CH_2)_6Si(CH_3)_2(CH_2)_9Si(OC_2H_5)_3$ [34]

$CH_3COO(CH_2)_{15}Si(OC_2H_5)_3$ [35]

$CF_3COO(CH_2)_{15}Si(OC_2H_5)_3$ [36]

$CF_3COO(CH_2)_{15}Si(OCH_3)_3$ [37]

$CF_3(CF_2)_9(CH_2)_2Si(OC_2H_5)_3$ [38]

$CF_3(CF_2)_7(CH_2)_2Si(OC_2H_5)_3$ [39]

$CF_3(CF_2)_5(CH_2)_2Si(OC_2H_5)_3$ [40]

$CF_3(CF_2)_7C_6H_4Si(OC_2H_5)_3$ [41]

$CF_3(CF_2)_9(CH_2)_2Si(OCH_3)_3$ [42]

$CF_3(CF_2)_5(CH_2)_2Si(OCH_3)_3$ [43]

$CF_3(CF_2)_7(CH_2)_2SiCH_3(OC_2H_5)_2$ [44]

$CF_3(CF_2)_7(CH_2)_2SiCH_3(OCH_3)_2$ [45]

$CF_3(CF_2)_7(CH_2)_2Si(CH_3)_2OC_2H_5$ [46]

$CF_3(CF_2)_7(CH_2)_2Si(CH_3)_2OCH_3$ [47]

In view of maintenance of apparatus and working environment, the compounds represented by the formulas of [12]–[47] are preferable because hydrogen chloride is not generated.

The compound represented by the formula of $CF_3(CF_2)_7-(CH_2)_2-SiCl_3$ reacts with the hydroxyl group as follows:

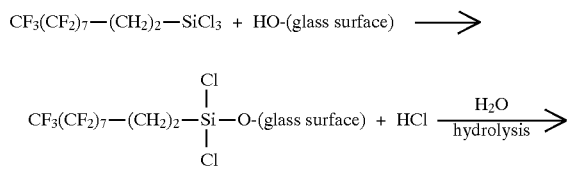

-continued

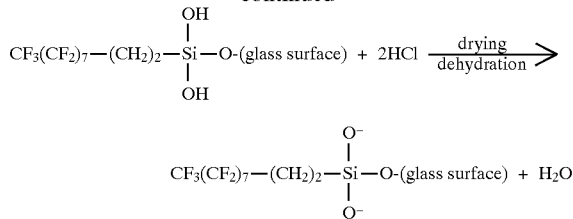

The first step of the above reaction was generally called an adsorbing reaction.

As the solvent, a non-aqueous solvent not including an active hydrogen is preferably used. As such a solvent, there can be mentioned, for example, a hydrocarbon-based solvent, a fluorocarbon-based solvent and a silicone-based solvent, more specifically petroleum naphtha, solvent naphtha, pertroleum ether, petroleum benzin, isoparaffin, normal paraffin, decalin, industrial gasoline, kerosene, ligroin, dimethylsilicone, phenylsilicone, alkyl-modified silicone and polyethersilicone and the like. As a fluorocarbon-based solvent, there can be mentioned, for example, chlorofluorocarbon-based solvent, more specifically "Florinate" (a trade name of 3M) and "Aflude" (a trade name of Asahi Glass).

As the float glass, any plate glass like a colorless transparent soda-lime silicate glass and a tinted transparent soda-lime silicate glass made by a float process can be used.

Figure 5:
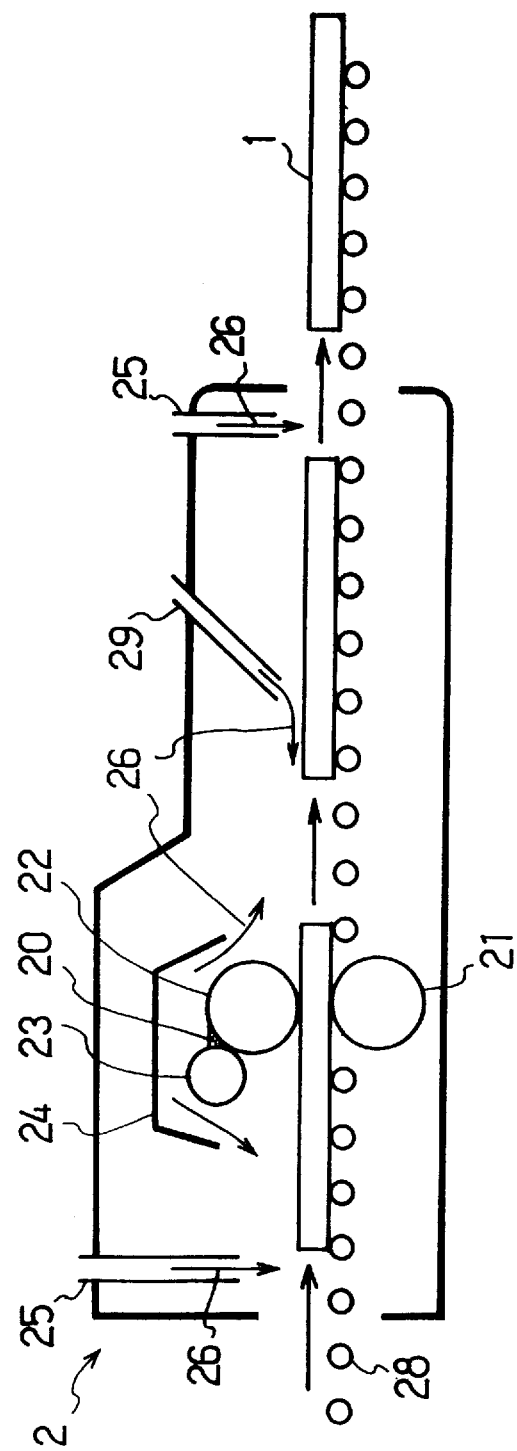
FIG. 5 shows a schematic sectional view of an apparatus suitable for the process of the invention.

Referring now to FIG. 5, there is a specific apparatus for carrying out the process of the invention. This apparatus comprises a plurality of rolls 28 in line for conveying a glass plate, a support roll 21 in the line, a coating roll 22 above the support roll 21 and a doctor roll 23 located diagonally with respect to the coating roll 22. The doctor roll 23 keeps in contact with the coating roll 22, while a space about equal to the thickness of the glass plate being coated is maintained between the support roll 21 and the coating roll 22. The space is adjustable according to the thickness of a glass plate. Various kinds of rubber and sponge are suitable for the material of the coating roll 22 and the doctor roll 23.

Figure 11:
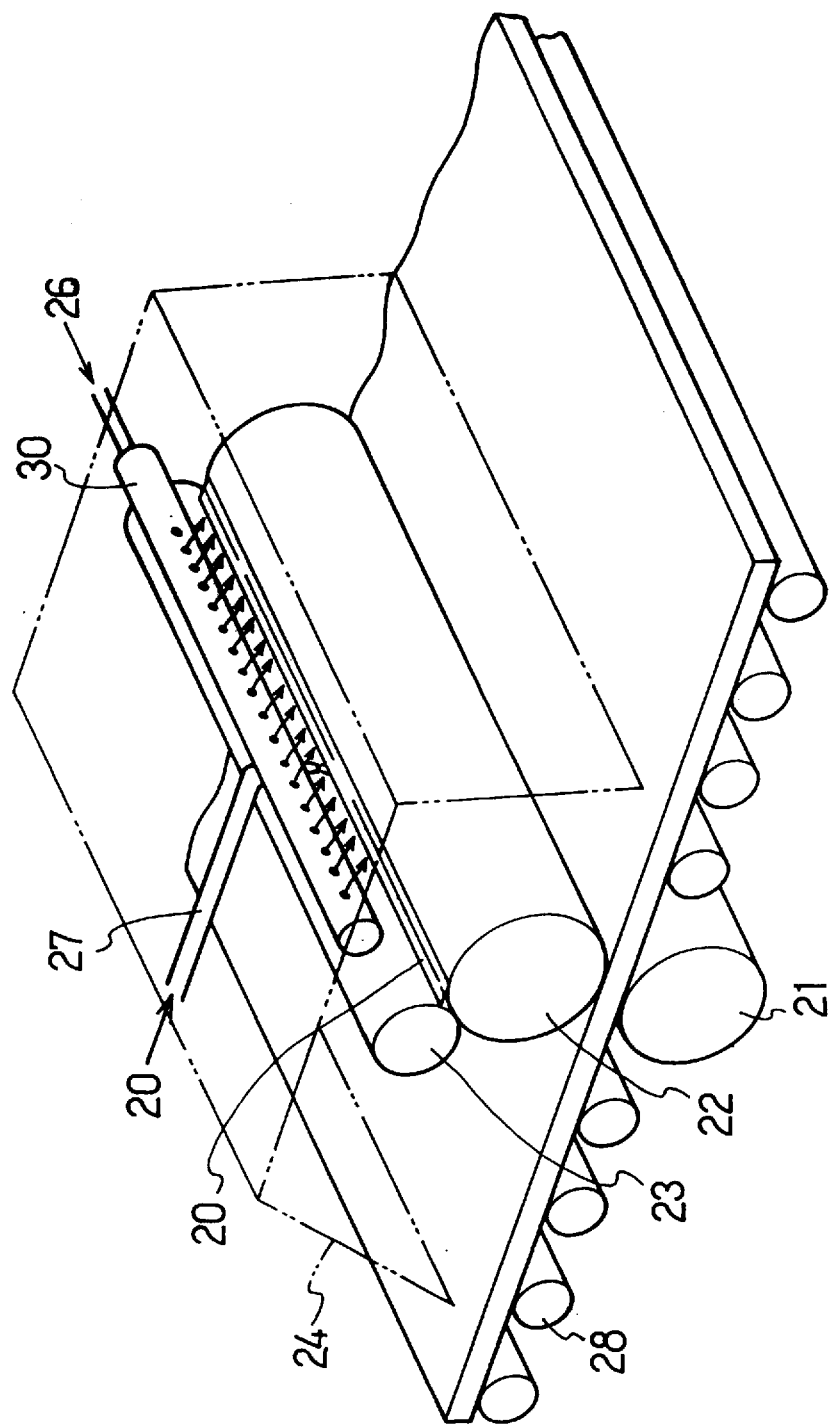
FIG. 11 shows a coating portion of the apparatus seen in FIG. 5.

A covering 24 i s located over the coating roll 22 and the doctor roll 23, and covers them. As shown in FIG. 11, a gas pipe 30, having a plurality of holes in line, is lead to the space covered with the covering 24 to introduce gas there. Thus, the space can be filled with low humidity gas like dry air while applying a solution to prevent a compound in the solution from hydrolizing.

The apparatus is provided with an air knife 29 over the conveyer rolls 28 located on the lower reaches of the line. The air knife 29 is set at a slant, from which gas flows up the line to brush the surface to remove surplus solution. The apparatus is also provided with two air curtains 25; one is located near the begininng of the line and the other is located near the end to prevent the air around the apparatus from invading through the entrance or the exit for the glass plate.

Solutuion to be applied 20 is supplied from a tank, not shown, through a pipe 27 into a groove between the coating roll 22 and the doctor roll 23. The solution 20 is applied on the surface of the glass via the surface of the coating roll 22, which rotates clockwise in FIG. 5. The force of the doctor roll 23 on the coating roll 22 may be controlled for adjusting the thickness of the applied solution. The thickness can be adjusted by other controls like a speed control in conveying the glass.

EXAMPLES

Example 1

Light from an ultraviolet lump with an emission below 300 nm was applied to the surface of float glasses (colorless transparent soda-lime silicate glasses). It was settled that the surface in which an emission of light due to tin was observed was the bottom-side surface and the other surface in which the emission was not observed was the top-side surface.

As a silane-based compounds, a kind of fluoroalkyltrichlorosilane, represented by the formula $CF_3(CF_2)_7—(CH_2)_2—SiCl_3$ (n-heptadecafluorotetrahydroalkyltrichlorosilane) was dissolved in octadecafluorooctane, a kind of non-aqueous solvent, to prepare a one volume % solution.

Figure 2A:
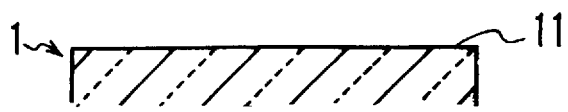
FIGS. 2a–d show molecular scale schematic sectional views of a process as described in Example 1.
Figure 2B:
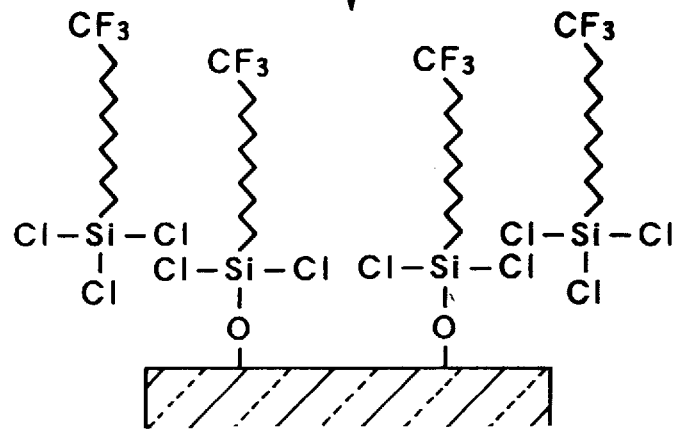

The solution was applied only to the top-side surface selected in the above selecting step to attain a thickness of 10–20 $\mu$m. In this adsorbing step, a condensation reaction of the fluoroalkyltrichlorosilane with hydroxyl group took place so that the fluoroalkyltrichlorosilane was fixed to the surface as illustrated in FIGS. 2(a) and 2(b).

Figure 2C:
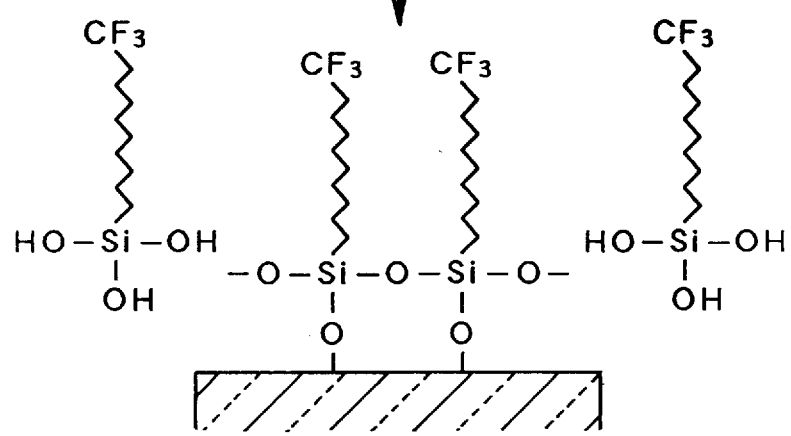

The glass was dried in the atmosphere including moisture. In this drying step, the molecules of fluoroalkyltrichlorosilane on the surface were condensed and connected with one another to give a stable film as illustrated in FIG. 2(c).

Figure 2D:
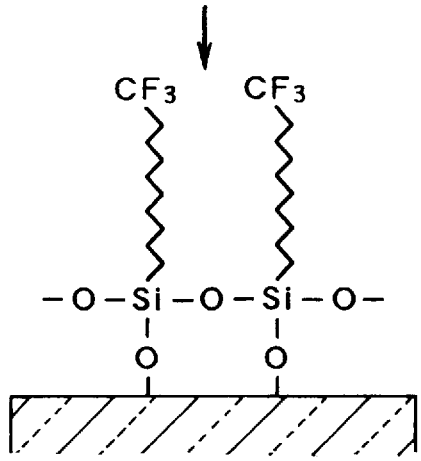

The glass was washed with octadecafluorooctane. In this washing step, the molecules not bonded to the top-side surface were dissolved and removed to give a monomolecular film including only the molecule bonded to the surface via a siloxane bond as illustrated in FIG. 2(d).

On the other hand, the monomolecular film was formed on the bottom side of a float glass by the same process as described above.

These two kinds of float glasses were left in the atmosphere and maintained at 300° C. for 100 hours. At every 20 hours, contact angles with respect to water were measured after removing contamination on the surfaces by ultrasonic washing in ethanol. The angles were measured with 10 $\mu$l of water dropped on the film. The results are shown in FIG. 3.

The surfaces with the films were rubbed with a sponge for washing tableware 10000 times under the pressure of 2 kgf. At every 2000 times, contact angles with respect to water were measured in the same manner as described above. The results are shown in FIG. 4.

Figure 3:
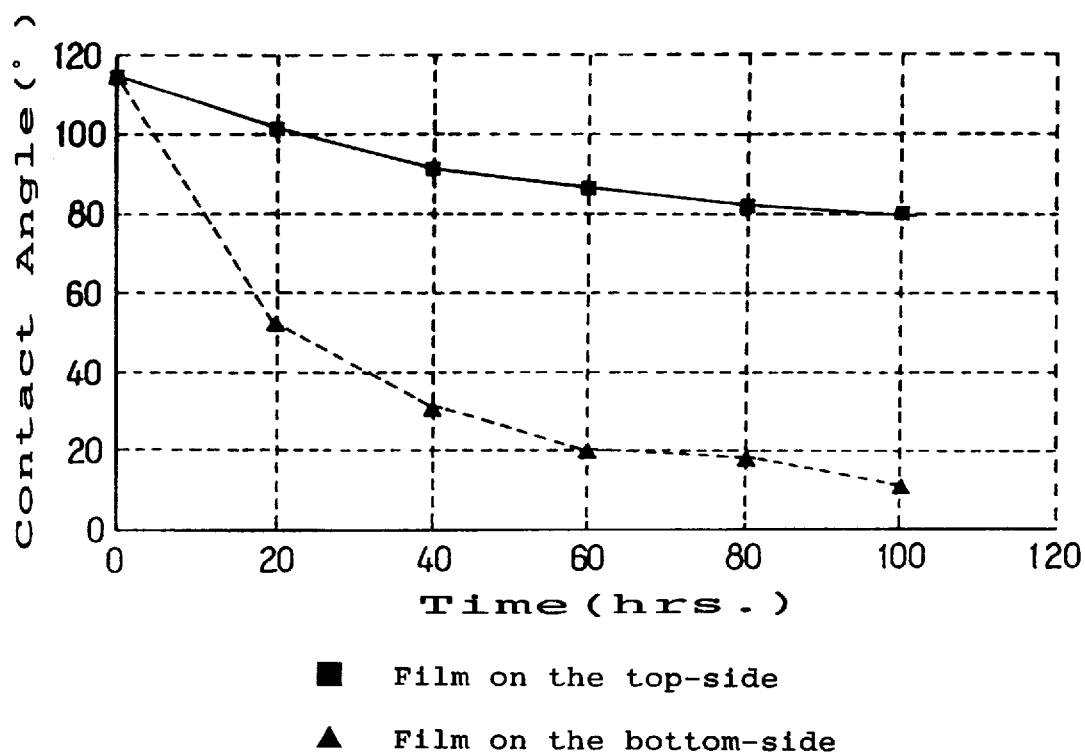
FIG. 3 shows a contact angle graph for a heat-resistance test described in Example 1.
Figure 4:
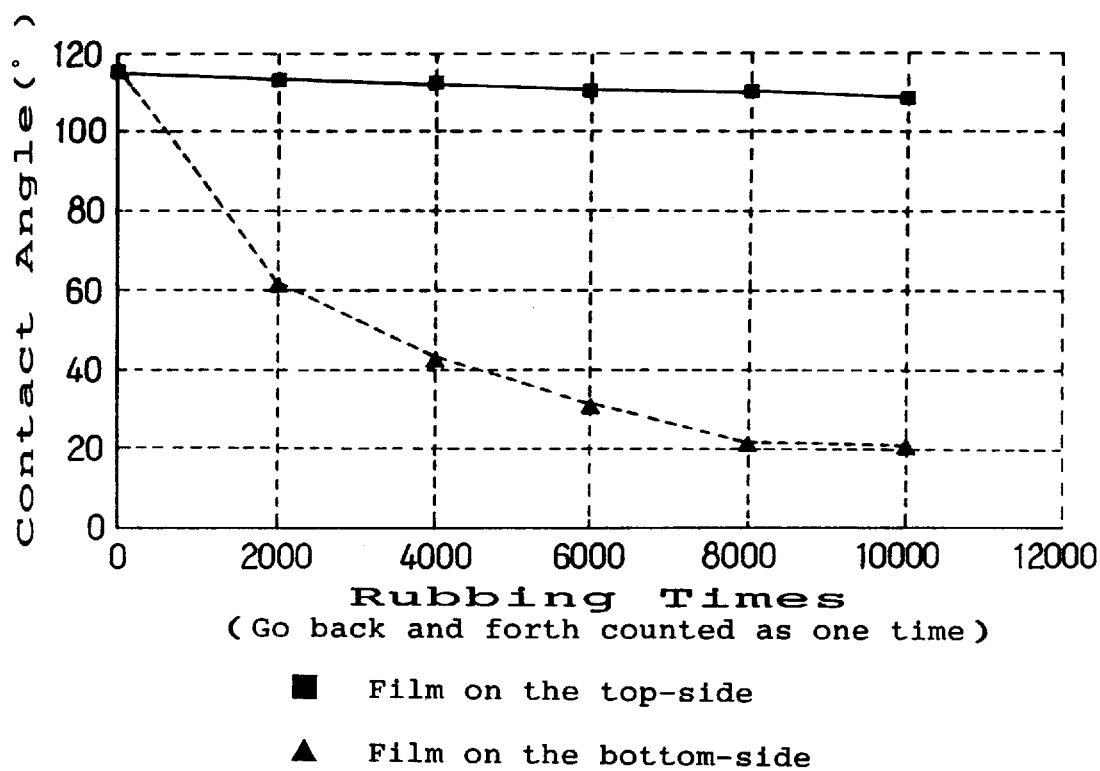
FIG. 4 shows a contact angle graph for an abrasion-resistance test described in Example 1.

As seen in FIGS. 3 and 4, the contact angle on the top-side surface dropped less rapidly and was higher than that on the bottom-side surface to show that the film on the top-side surface was better in heat-resistance and abrasion-resistance.

Example 2

With the apparatus as shown in FIG. 5, films for contamination-resistance were formed on the top-side surfaces of a float glass. As a material of the coating roll 22 and the doctor roll 23, butyl rubber was used. As the solution 20 for coating, a one volume % solution of the above fluoroalkyltrichlorosilane in octamethylcyclotetrasiloxane was prepared. The boiling point of octamethylcyclotetrasiloxane is 175° C. The following processes in this example were followed at room temperature.

Dry air 26 at a humidity of not more than 35% was introduced from air curtains 25 into the apparatus to keep the inside of the apparatus dry. The dry air was also introduced into a covering 24 to keep the humidity around the coating roll 22 and the doctor roll 23 low reliably.

A plate of a float glass was supplied from the entrance of the apparatus with the top-side surface upward. The solution 20 was applied from the coating roll 22 to the top-side surface moving on the rolls 28. The applied solution was controlled at a thickness between 0.5 $\mu$m and 1 $\mu$m by the pressure of the coating roll 22 on the doctor roll 23 and on the glass plate. The thickness was able to be controlled by the pressure of the docter roll 23 to the coating roll 22.

On the lower reaches of the line, the dry air with a high pressure was blown on the top-side surface of the glass plate from the air knife 29 to blow off a surplus solution. The glass coated with the solution was carried out through the exit to the atmosphere.

Figure 6A:
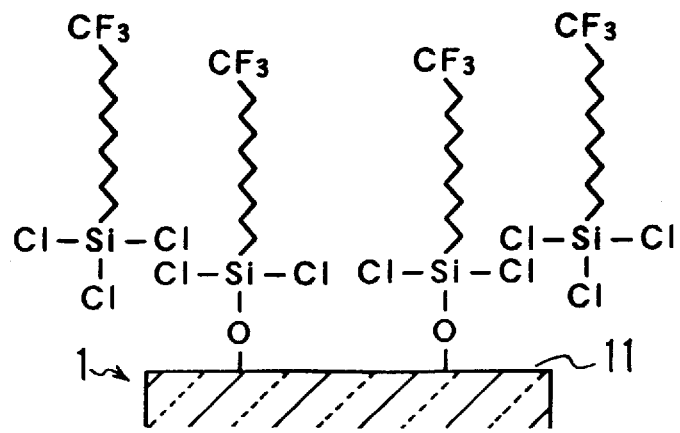
FIGS. 6a–c show molecular scale schematic sectional views of a process as described in Example 2.
Figure 6B:
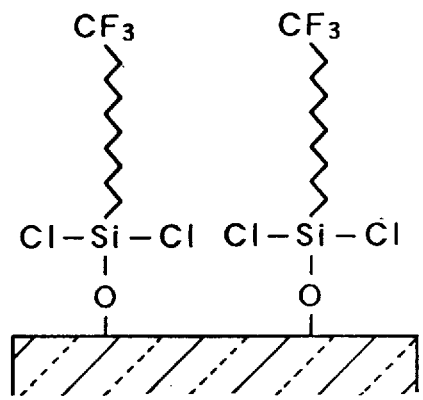
Figure 6C:
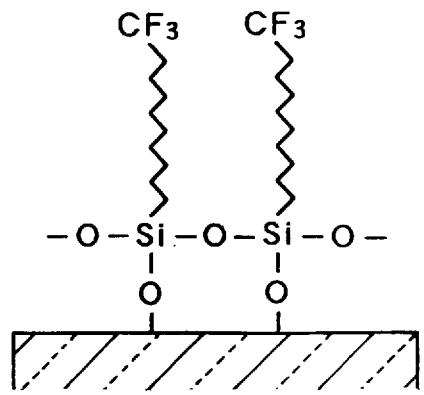
Figure 7:
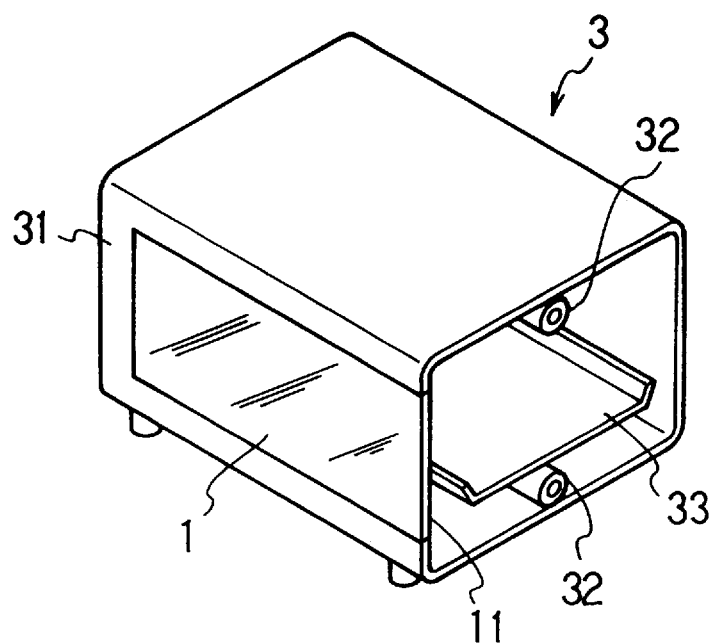
FIG. 7 shows a partially cutaway perspective view of a toaster oven with a contamination-riong glass as descrived in Example 5.

As shown in FIG. 6, the film was formed on the top-side surface 11 of the glass 1 through the process. First, a condensation reaction took place between the molecules of fluoroalkyltrichlorosilane and the hydroxyl groups on the surface so that the molecules of fluoroalkyltrichlorosilane were adsorbed to the surface (FIG. 6(a)). Second, surplus solution on the surface was removed with dry air from the air knife so that only the molecules chemically bonded to the surface were left on the surface (FIG. 6(b)). Third, when the glass was carried out to the atomosphere, the molecules of fluoroalkyltrichlorosilane were condensed to connect with one another via siloxane bonds and form the contamination-resistant film (FIG. 6(c)). This process was characterized in the elimination of surplus silane-based compounds with dry air.

On the other hand, the monomolecular film was formed on the same side of a float glass by the same process as described above except that dry air was not applied.

These two kinds of float glasses were observed in appearance and left in the atmosphere and maintained at 300° C. for 6 hours. The contact angles with respect to 5 $\mu$l of water dropped on the film were measured. The above contact angles were measured with "S-150" (a trade name of Kyowa kaimen Science). The results are shown in Table 1.

TABLE 1

|  | With dry air blown | Without dry air blown |
| --- | --- | --- |
| Appearance | No defect | observed white spots |
| Contact angle with respect water (°) | | |
| Initial Value | 112 | 112 |
| After test | 103 | 99 |

As seen in Table 1, the glass dry air was applied to has a higher contact angle after heating and a better appearance of the film than when dry air was not applied, although the initial contact angles are equal.

Example 3

Investigating the influence of a solvent, the contamination-resistant films were formed on the top-side surfaces of float glasses by the same process as described in Example 2, in which dry air was applied, except for subsituting n-hexadecane or octadecafluorooctane for octamethylcyclotetrasiloxane as a non-aqueous solvent.

The films were observed and tested in the same manner as described in Example 2. The results are shown in Table 2.

Example 4

The contamination-resistant films were formed on the top-side surfaces of float glasses in the same manner as described in Example 2, in which dry air was applied, except for substituting decamethylcyclotetrasiloxane, whose boiling point is 210° C., for octamethylcyclotetrasiloxane, whose boiling point is 175° C.

The films were observed and tested in the same manner as described in Example 2. The results are shown in Table 2.

As seen in Table 2, a silicone-based solvent is suitable for the solvent in the invention, because it can control the reaction of the silane-based compound with water in the atmosphere. The solvent with a lower boiling point is better in the invention, because it can be easily dried out.

TABLE 2

|  | n-hexadecane | octadeca-fluoro-octane | decamethyl-cyclopenta-siloxane | octamethyl-cyclotetra-siloxane |
|---|---|---|---|---|
| Appearance | observed thin white spots | observed thin white spots | observed thin white spots | No defect |
| Contact angle with respect to water (°) | | | | |
| Initial Value | 112 | 111 | 112 | 112 |
| After test | 92 | 95 | 99 | 103 |

Example 5

The contamination-resistant glasses having the film on the top-side surface or the bottom-side surface produced in Example 1 were installed in the front door 31 of a commercial toaster oven, which can open on a hinge 34. The glasses were oriented with the surface of the film set toward the inside, namely the cooking side, of the oven.

Some kinds of food on a plate 33 were cooked with heaters 32. A cooking cycle was repeated, which consisted of seven times of toasting, one time of heating a frozen pizza, one time of reheating fried food and heating a frozen gratin.

After every cycle, the surface with the film was rubbed with a sponge for tableware with water at a pressure of 2 kgf 100 times. The ratio of the area where contamination was removed to the entire area and the contact angle with respect to 10 μm of water dropped on the surface were measured. Float glasses without a film were installed in the oven with a top-side surface or a bottom-side surface set toward the inside and were tested in the same manner as described above. The results are shown in FIGS. 8 and 9.

Figure 8:
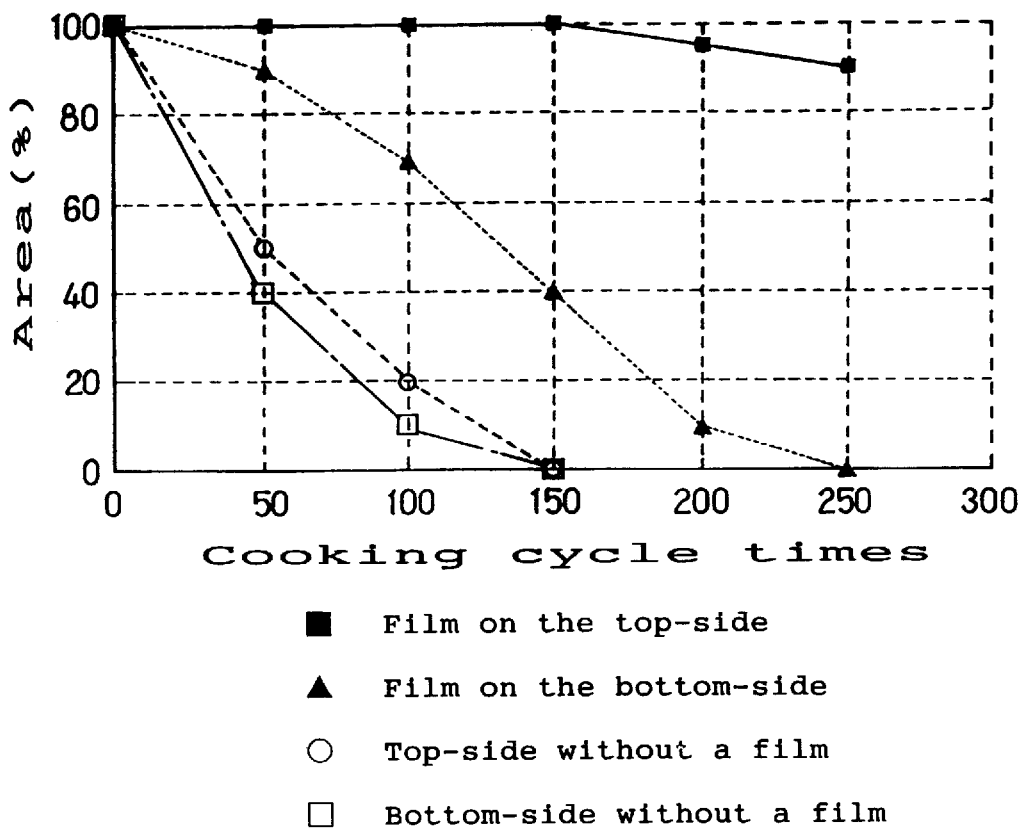
FIG. 8 shows a contact angle graph for a contamination-removal test described in Example 5.
Figure 9:
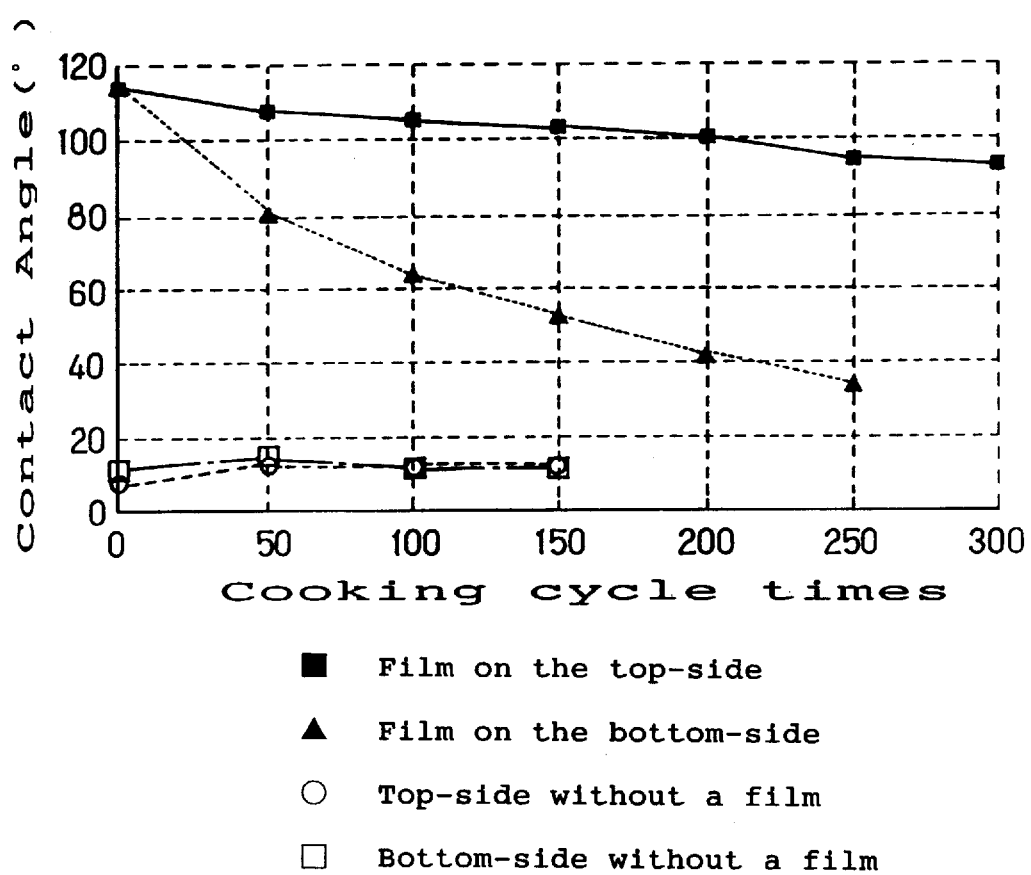
FIG. 9 shows a contact angle graph for a cooking-cycle test described in Example 5.
Figure 10:
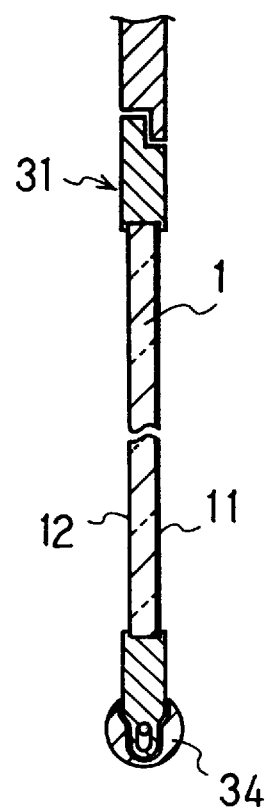
FIG. 10 shows a sectional view of the front window of the toaster oven seen in FIG. 7.

As seen in FIGS. 8 and 9, the film including fluoroalkyl-silane bonding to the top-side surface 11 via a siloxane bond was better in contamination-resistance than that on the bottom-side surface 12.

We claim:

1. A process for producing a contamination-resistant float glass, which comprises:
   selecting a top-side surface from the surfaces of a float glass, the top-side surface of the float glass being free from a diffused tin layer from a float bath;
   contacting a solution with only the top-side surface with a roller coater a brush, a cast coater with a film, a docter blade, a spray coater or a spin coater, the solution including a silane-based compound having a straight-chain of carbons, selected from the group consisting of silicon halogenide, silicon alkoxide and silicon isocyanide; and
   reacting the silane-based compound with a hydrophilic group on the top-side surface to bond a molecule including the straight-chain of carbons to the top-side surface covalently via a siloxane bond.

2. A process for producing a contamination-resistant float glass according to claim 1, further comprising: drying the top-side surface.

3. A process for producing a contamination-resistant float glass according to claim 1, wherein the solution is contacted with the top-side surface with a roller coater.

4. A process for producing a contamination-resistant float glass according to claim 3, wherein the roller coater includes a doctor roll for widening the solution to the width for coating and a coating roll for applying the solution to the top-side surface.

5. A process for producing a contamination-resistant float glass according to claim 4, wherein the humidity around the coating roll and the doctor roll is maintained at not more than 35%.

6. A process for producing a contamination-resistant float glass according to claim 4, wherein low humidity gas is supplied into a space covered with a covering that covers the coating roll and the doctor roll so that the humidity around the coating roll and the doctor roll is maintained at not more than 35%.

7. A process for producing a contamination-resistant float glass according to claim 2, wherein surplus solution is removed in the drying step with low humidity gas blown on the top-side surface.

8. A process for producing a contamination-resistant float glass according to claim 1, wherein the molecule includes a group selected from the group consisting of an alkyl group and a fluoroalkyl group.

9. A process for producing a contamination-resistant float glass according to claim 1, wherein the silane-based compound is represented by the following formula:

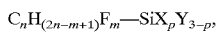

wherein n represents an integer between 1 and 22, m represents an integer between zero and 2n+1; p represents zero, one or two; X represents hydrogen, an alkyl group, an alkoxyl group, an alkyl group with fluorine or an alkoxyl group with fluorine; and Y represents a halogen group, an alkoxyl group or an isocyanate group.

10. A process for producing a contamination-resistant float glass according to claim 8, wherein the silane-based compound is represented by the following formula:

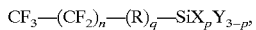

wherein n represents an integrer between 1 and 22; p represents zero, one or two; q represents zero or one; R represents an alkyl group, a vinyl group, an ethynyl group, an aryl group, or an group including a silicon atom or an oxygen atom; X represents a hydrogen, an alkyl group, an alkoxyl group, an alkyl group with fluorine or an alkoxyl group with fluolrine; and Y represents a halogen group, an alkoxyl group or an isocyanate group.

11. A process for producing a contamination-resistant float glass according to claim 1, wherein the reaction of the silane-based compound with the hydrophilic group is accompanied by the elimination of a group selected from the group consisting of a halogen group, an alkoxyl group and an isocyanate group.

12. A process for producing a contamination-resistant float glass according to claim 1, wherein the molecules including the straight-chain of carbons form into a film selected from the group consisting of a monomolecular film and a polymer film.

13. A process for producing a contamination-resistant float glass according to claim 1, wherein the top-side surface, to which the molecules including the straight-chain of carbons bond, is fixed for the surface expected to be contaminated.

14. A process for producing a contamination-resistant float glass according to claim 1, wherein the solution includes a non-aqueous solvent whose boiling point is not more than 200° C.

15. A process for producing a contamination-resistant float glass according to claim 1, wherein the solution includes a solvent whose chief ingredient is silicone.

16. A process for producing a contamination-resistant float glass according to claim 1, wherein the concentration of the silane-based compound in the solution is not more than 10 volume %.

* * * * *